United States Patent [19]

Ikeji et al.

[11] Patent Number: 4,754,134
[45] Date of Patent: Jun. 28, 1988

[54] METHOD OF AND APPARATUS FOR INSPECTING A STRIPPED WIRE END

[75] Inventors: Masahiro Ikeji; Kenji Nakata, both of Takarazuka, Japan

[73] Assignee: Shin Meiwa Industry Co., Ltd., Hyogo, Japan

[21] Appl. No.: 39,066

[22] Filed: Apr. 16, 1987

[51] Int. Cl.$^4$ .......................... G01N 9/04; G06M 7/00
[52] U.S. Cl. .................................. 250/223 R; 250/561
[58] Field of Search ............... 250/223 B, 223 R, 560, 250/561; 427/117, 118; 356/384, 385, 386, 387, 388, 376

[56] References Cited

U.S. PATENT DOCUMENTS

| | | | |
|---|---|---|---|
| 4,384,303 | 5/1983 | Brenke et al. | 250/223 R |
| 4,405,233 | 9/1983 | Grau | 250/223 R |
| 4,457,622 | 7/1984 | Kato et al. | 250/560 |
| 4,605,857 | 8/1986 | Ninomiya et al. | 250/560 |

Primary Examiner—David C. Nelms
Assistant Examiner—William L. Oen
Attorney, Agent, or Firm—Lowe, Price, LeBlanc, Becker & Shur

[57] ABSTRACT

Two photoelectric switches on a path for coating stripping processing of a wire detect passages of an exposed core portion and a residual coating portion of a wire end respectively in a non-contact manner, to derive passage signals corresponding to the times of the passages. These passage signals are compared in length with each other, whereby a decision of effective stripping is made when the difference therebetween is larger than a prescribed value while a decision of defective stripping is made when the difference is smaller than the prescribed value.

10 Claims, 2 Drawing Sheets

METHOD OF AND APPARATUS FOR INSPECTING A STRIPPED WIRE END

BACKGROUND OF THE INVENTION

1. Field of the Invention

The present invention relates to a method of and an apparatus for inspecting a wire end whose coating is stripped to expose its core, and more particularly, it relates to a method of and an apparatus for inspecting a stripped wire end, employed in an automatic terminal application apparatus.

2. Description of the Prior Art

In an automatic terminal application apparatus for continuously and automatically performing terminal application processing including a process of stripping the coating of a wire end and a process of applying a terminal to the stripped portion by pressure, generally performed is inspection through a as shown in FIG. 1, for example, which is disclosed in Japanese Utility Model Laying-Open Gazette No. 153089/1981 in the name of Shin Meiwa Industry Co., Ltd., the assignee of this case, in order to inspect whether or not the coating stripping process is effectively performed. The detecting brush is formed by a pair of plate spring electrodes 1 and 2, which are provided on a processing path (transfer path for a wire end) of an automatic terminal application apparatus so that an exposed core portion 3 of a wire whose coating is stripped passes through the same.

The plate spring electrodes 1 and 2 are generally separated from each other with a small space to be in nonconducting states as shown in FIG. 1, for example. When the plate spring electrodes 1 and 2 are further separated from each other by the core portion 3 passing through the said space, a decision of effective stripping is made upon conduction while a decision of defective stripping is made on the assumption that the core is not exposed if the electrodes 1 and 2 remain in the nonconducting states. The plate spring electrodes 1 and 2 may be partially in contact with each other to be normally retained in conducting states, and in this case, a decision of effective stripping is made if the electrodes 1 and 2 remain in the conducting states when the core portion 3 separates the electrodes 1 and 2 from each other to pass through the contact portion, while a decision of defective stripping is made if the electrodes 1 and 2 enter nonconducting states.

In a conventional inspection method employing such a detecting brush, fine adjustment must be performed in response to the diameter of the wire and the spring constant (pressing force) of the plate spring electrodes in order to avoid erroneous inspection and defective application in the subsequent terminal application process, which fine adjustment is troublesome while operation stability of the automatic terminal application apparatus is influenced by the degree of the fine adjustment. For example, when the pressing force between the plate spring electrodes 1 and 2 is decreased with respect to a large-diametrical wire having a hard core, the exposed core portion 3 may push up only one of the plate spring electrodes (e.g., the electrode 1) to pass through the space between the same, thereby to cause erroneous inspection. If the pressing force between the plate spring electrodes 1 and 2 is strong as compared with the hardness of the core to the contrary, the core is inevitably bent when the exposed core portion 3 passes through the space between the plate spring electrodes 1 and 2, to cause erroneous application of the terminal in the subsequent process.

SUMMARY OF THE INVENTION

A method of inspecting a stripped wire end according to the present invention comprises a step of detecting passages of an exposed core portion and a residual coating portion of a wire end respectively in a non-contact manner on a path for a coating stripping process to derive first and second passage signals having lengths corresponding to the times of the passages and a step of comparing the lengths of the first and second passage signals to make a decision of effective stripping when the difference therebetween is larger than a prescribed value while making a decision of defective stripping when the difference is smaller than the prescribed value.

An apparatus for inspecting a stripped wire end according to the present invention comprises two detecting means provided on a path for a coating stripping process so that outputs from the detecting means are inputted into decision means for deciding whether or not the coating is effectively stripped. The two detecting means detect passages of an exposed core portion and a residual coating portion of a wire end on the path in a non-contact manner respectively, to derive first and second passage signals having lengths corresponding to the times of the passages respectively, while the decision means compares the lengths of the first and second passage signals to make a decision of effective stripping when the difference therebetween is larger than a prescribed value while making a decision of defective stripping when the difference is smaller than the prescribed value.

Accordingly, it is an object of the present invention to provide a method of and an apparatus for inspecting a stripped wire end in a non-contact manner with no influence being exerted on an exposed core portion of the wire, which can be applied to a wire of an arbitrary diameter without requiring adjustment.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
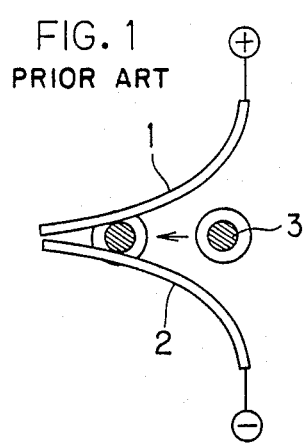
FIG. 1 is an explanatory diagram showing a conventional detecting brush.
Figure 2:
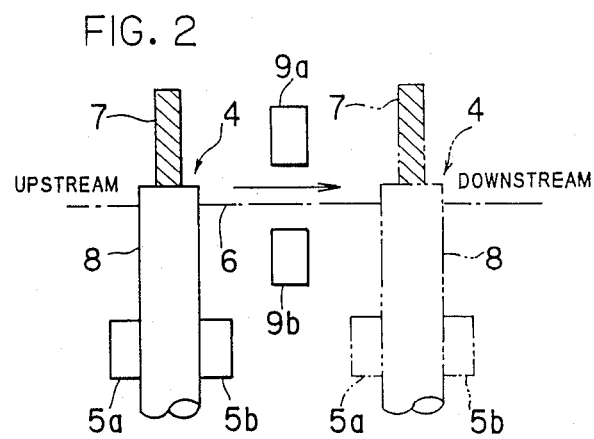
FIG. 2 is a schematic explanatory diagram showing an embodiment of the present invention.

FIG. 2 is a schematic explanatory diagram showing an embodiment of an apparatus for inspecting a stripped wire end according to the present invention. Referring to FIG. 2, the bottom of a wire end 4 whose coating has been stripped is gripped by a pair of carrier pawls 5a and 5b to be transferred on a processing path 6 from a left side (upstream side) to a right side (downstream side) as shown by a solid arrow. In the case of the aforementioned automatic terminal application apparatus, for example, a coating stripping unit is present in the upstream side of the figure while a terminal application unit is present in the downstream side.

The inventive apparatus for inspecting a stripped wire end has a pair of photoelectric switches 9a and 9b for detecting passages of an exposed core portion 7 and a residual coating portion 8 of the wire end 4 transferred along the processing path 6. The photoelectric switch 9a is provided on a transfer path for the exposed core portion 7, and the other photoelectric switch 9b is provided on a transfer path for the residual coating portion 8.

Figure 3A:
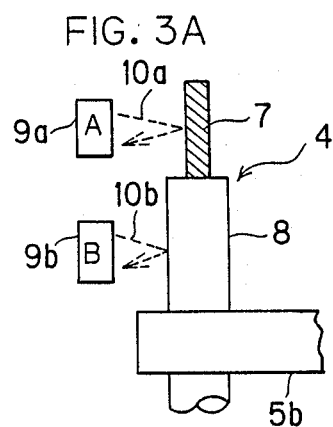
FIGS. 3A and 3B are arrangement diagrams of photoelectric switches.
Figure 3B:
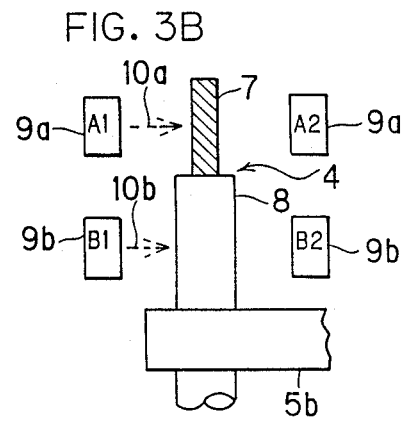

FIG. 3A is an arrangement diagram showing reflection type photoelectric switches 9a and 9b and FIG. 3B is an arrangement diagram showing opposed type photoelectric switches 9a and 9b. Each of FIGS. 3A and 3B shows the wire end 4 gripped by the carrier pawls 5a and 5b (the upstream side carrier pawl 5a is at the back of the downstream side carrier pawl 5b and not shown in the figure) as viewed from the downstream side to the upstream side of the transfer path 6 of FIG. 2, and the wire end 4 is in a position opposite to the photoelectric switches 9a and 9b.

As shown in FIG. 3A, the reflection type photoelectric switches 9a and 9b are respectively formed by single switch units A and B, which are provided in upper portions of the transfer paths for the exposed core portions 7 and the residual coating portions 8 respectively. The respective switch units A and B have floodlamps and light receivers, so that lights 10a and 10b emitted from the floodlamps are reflected by the surfaces of the exposed core portion 7 and the residual coating portion 8 respectively and the light receivers generate detecting signals upon catching the reflected lights. These detecting signals are continuous during catching of the reflected lights, and hence the lengths thereof are in correspondence to the passage times of the exposed core portion 7 and the residual coating portion 8 respectively.

Further, as shown in FIG. 3B, the opposed type photoelectric switches 9a and 9b are formed by pairs of floodlamp A1 and light receiver A2 and floodlamp B1 and light receiver B2 respectively. These pairs of floodlamps and light receivers A1, A2, B1 and B2 are oppositely proveded so that optical axes thereof are aligned through the transfer paths for the exposed core portion 7 and the residual coating portion 8 respectively. Lights 10a and 10b emitted from the floodlamps A1 and B1 are generally received by the light receivers A2 and B2 respectively since the optical axes thereof are aligned, while the light receivers A2 and B2 generate detecting signals when the exposed core portion 7 and the residual coating portion 8 shield the lights 10a and 10b as shown in the figure. These detecting signals are continuous during shielding of the lights 10a and 10b, and hence lengths thereof are in correspondence to the passage times of the exposed core portion 7 and the residual coating portion 8 respectively, similarly to the case of FIG. 3A.

The detecting signals thus derived from the photoelectric switches 9a and 9b are supplied as an exposed core portion passage signal and a residual coating portion passage signal respectively to a processing circuit as here-inafter described, to be employed for the decision of effective/defective stripping.

Figure 4:
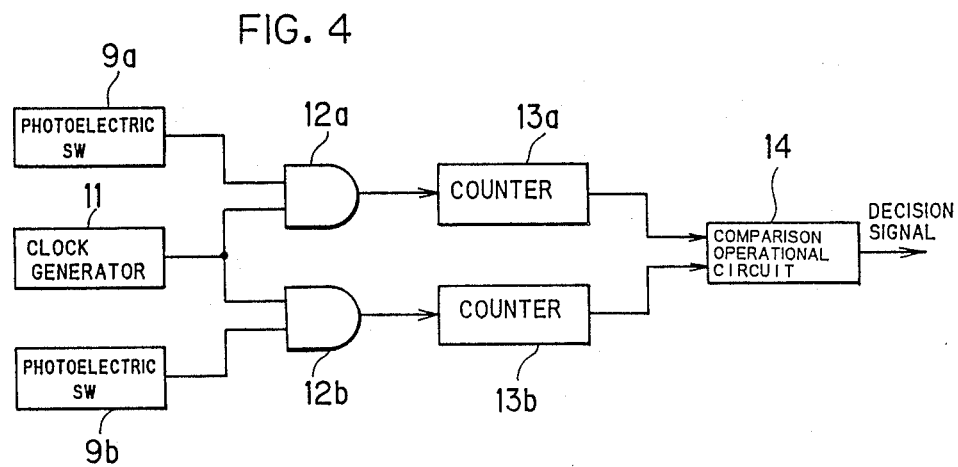
FIG. 4 is a schematic block diagram showing a processing circuit serving as a decision means.
Figure 5:
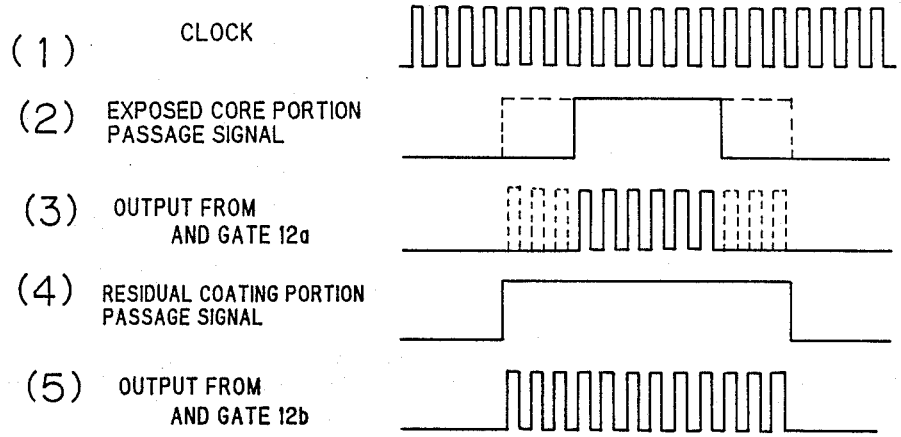
FIG. 5 is a waveform diagram showing waveforms of respective parts of FIG. 4.

FIG. 4 is a schematic block diagram showing such a processing circuit, and FIG. 5 is a waveform diagram showing waveforms of respective parts thereof. The processing circuit is formed by a clock generator 11 for generating clock pulses shown at FIG. 5(1), AND gates 12a for AND-processing the exposed core portion passage signal and the residual coating portion passage signal from the photoelectric switches 9a and 9b with the clock pulses of FIG. 5(1), counters 13a and 13b for counting outputs from the AND gates 12a and 12b respectively and a comparison operational circuit 14 for comparing output count values of the counters 13a and 13b, to serve as a decision means for deciding effective/defective stripping.

When the coating is effectively stripped, the exposed core portion passage signal derived from the photoelectric switch 9a is as shown by the solid line at FIG. 5(2) and the residual coating portion passage signal derived from the photoelectric switch 9b is as shown at FIG. 5(4). Time widths of the passage signals correspond to diameters of the exposed core portion 7 and the residual coating portion 8 shown in FIG. 2.

The AND gate 12a receives the clock signal of FIG. 5(1) and the exposed core portion passage signal of the solid line of FIG. 5(2) to perform AND processing, thereby to output a signal shown by the solid line at FIG. 5(3). The AND gate 12b receives the clock signal of FIG. 5(1) and the residual coating portion passage signal of FIG. 5(4) to perform AND processing, thereby to output a signal shown at FIG. 5(5). Pulse numbers included in the output signals from the AND gates 12a and 12b are proportional to the time widths of the respective passage signals.

These pulse numbers are counted by the counters 13a and 13b respectively, and the count values thereof are supplied to the comparison operational circuit 14. The comparison operational circuit 14 compares the count values, to decide whether or not the difference therebetween is larger than a prescribed value. When the difference is larger than the prescribed value, it is obvious that the core portion and the coating portion are sufficiently different in lateral width from each other since the coating has been effectively stripped. In this case, therefore, the comparison oprational circuit 14 outputs a decision signal indicating effective stripping. When the difference is smaller than the prescribed value, on the other hand, it is obvious that the core portion and the coating portion are not sufficiently different in lateral width from each other since the coating has been ineffectively stripped. In this case, therefore, the comparison operational circuit 14 outputs a decision signal indicating defective stripping. When, for example, zero is most simply selected as the prescribed value, effective/defective stripping is decided depending on whether or not the count values are equal to each other. As a matter of course, an appropriate prescribed value may be previously set in response to the configuration of the wire.

Assuming that zero is selected as the prescribed value, the output pulse numbers of the AND gates 12a and 12b shown at FIG. 5(3) and (5) are 6 and 12 respectively, whereby the comparison operational circuit 14 makes a decision of 12−6>0, i.e., 12>6, output a decision signal indication effective stripping.

Description is now made on the case of defective stripping. In this case, a core portion to be exposed is still coated, whereby the exposed core portion passage signal derived from the photoelectric switch 9a is in a time width as shown by dot lines at FIG. 5(2), which time width is similar to that of the residual coating portion passage signal shown at FIG. 5(4). Therefore, the output pulse number (=12) of the AND gate 12a shown by dot lines at FIG. 5(3) is equal to the output pulse number (=12) of the AND gate 12b shown at FIG. 5(5). The comparison operational circuit 14 makes a decision of 12−12=0, i.e., 12=12, to output a decision signal indicating defective stripping.

The decision signal indicating effective/defective stripping thus obtained is employed for prescribed control. For example, the operation of the automatic terminal application apparatus may be emergency-stopped in response to the decision signal indicating defective stripping to enable manuam removal of the defective wire while driving an alarm to inform the operator of the defective stripping. Further, the automatic terminal application apparatus can be so formed as to automatically remove the defective wire in response to the decision signal indicating defective stripping, for example.

Figure 6:
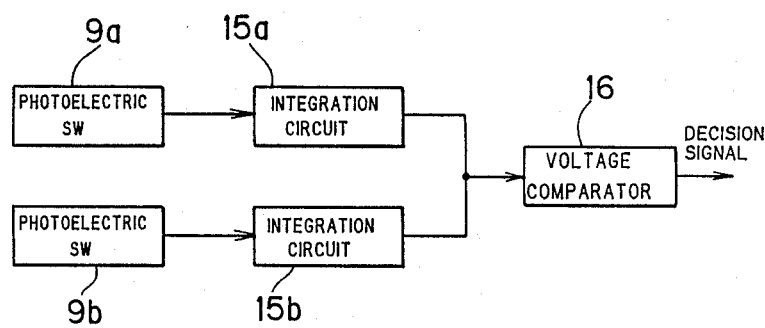
FIGS. 6 and 7 are schematic block diagrams showing other embodiments of the present invention.
Figure 7:
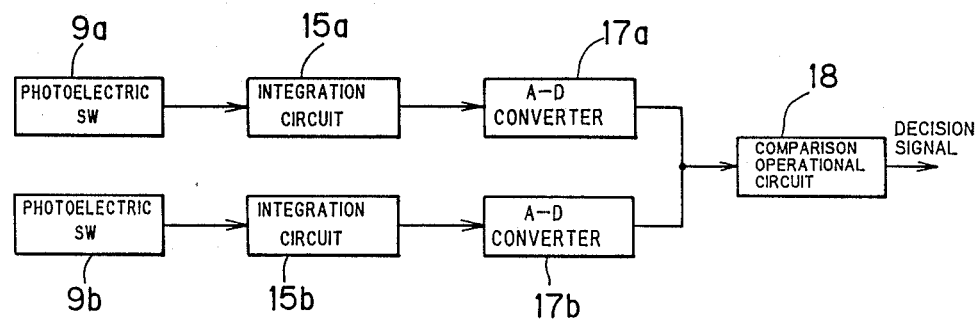

FIGS. 6 and 7 are schematic block diagrams showings other embodiments of the processing circuit of FIG. 4 serving as decision means. While the processing circuit shown in FIG. 4 has converted the widths of the core portion and the coating portion into digital values (pulse numbers), the processing circuits shown in FIGS. 6 and 7 are adapted to convert the widths into analog values (voltage values) through intergration circuits 15a and 15b.

In the embodiment shown in FIG. 6, the integration circuits 15a and 15b receive the passage signals shown at FIG. 5(2) and (4) from photoelectric switches 9a and 9b respectively to integrate the same, thereby to convert the same into voltage values corresponding to the time widths of the respective passage signals. These voltage values are supplied to a voltage comparator 16. The voltage comparator 16 compares the voltage values, to output a decision signal indicating effective stripping when the difference therebetween is larger than a prescribed value while outputting a decision signal indicating defective stripping when the difference is smaller than the prescribed value. Such comparison is similar to that in the aforementioned comparison operational circuit 14 of FIG. 4.

The embodiment shown in FIG. 7 is similar to the embodiment of FIG. 6, except for that output voltage values from the integration circuits 15a and 15b are conveted into digital values through A-D converters 17a and 17b to be compared with each other. The output digital values from the A-D converters 17a and 17b are in correspondence to the time widths of the respective passage signals from photoelectric switches 9a and 9b shown at FIG. 5(2) and (4), and a comparision operational circuit 18 performs comparing operation similar to the above on the digital values, to output a decision signal indicating effective/defective stripping.

Although the aforementioned embodiments employ the photoelectric switches 9a and 9b which are most simple and resonable detecting means for deriving the passage signals, such detecting means are not retricted to the photoelectric switches, but may be prepared by any means so far as the same can detect passages of the exposed core portion 7 and the residual coating portion 8 and output passage signals corresponding to the passage times. For example, optical fiber sensors may be formed by coupling optical fiber elements to detecting head portions of photoelectric switches, to be effectively applied to the case of a narrow installation space.

According to the present invention as hereinabove described, the wire end is inspected in a non-contact manner, whereby no influence is exerted to the wire end, particularly the exposed core portion, as in the conventional case of employing contact inspection through a detecting brush. Therefore, the terminal can be reliably applied by pressure in the subsequent step in the automatic terminal application apparatus. Further, the passage signals having lengths corresponding to the widths of the exposed core portion and the residual coating portion are derived to be compared with each other, whereby no adjustment is required even if the wire is varied in thickness. Thus, no erroneous operation is caused by defective adjustment as in the conventional case, whereby the operation is extremely stabilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of inspecting a stripped wire end whose core is exposed through coating stripping processing, said method comprising steps of:
   detecting passages of an exposed core portion and a residual coating portion of said wire end on path for said coating stripping processing in a non-contact manner, to derive first and second passage signals having lengths corresponding to time of said passages; and
   comparing said lengths of said first and second passage signals to make a decision of effective stripping when difference therebetween is larger than a prescribed value while making a decision of defective stripping when said difference is smaller than said prescribed value.

2. A method of inspecting a stripped wire end in accordance with claim 1, wherein said detecting is performed by photoelectric switches.

3. A method of inspecting a stripped wire end in accordance with claim 1, wherein said decision is performed by counting prescribed clocks only for the intervals of said first and second passage signals to obtain first and second count values respectively and comparing said first and second count values with each other.

4. A method of inspecting a stripped wire end in accordance with claim 1, wherein said decision is performed by integrating said first and second passage signals to obtain first and second integrated voltages respectively and comparing said first and second integrated voltages with each other.

5. A method of inspecting a stripped wire end in accordance with claim 1, wherein said decision is performed by integrating said first and second passage signals to obtain first and second integrated voltages respectively, converting said first and second integrated voltages into digital values and comparing said digital values with each other.

6. An apparatus for inspecting a stripped wire end whose core is exposed through coating stripping processing, said apparatus comprising:
   first and second detecting means provided on a path for said coating stripping processing to detect passages of an exposed core portion and a residual coating portion of said wire end in a non-contact manner, thereby to provide first and second passage signals having lengths corresponding to the times of said passages; and decision means for comparing said lengths of said first and second passage signals to make a decision of effective stripping when difference therebetween is larger than a prescribed valus while making a decision of defective stripping when said difference is smaller than said prescribed value.

7. An apparatus for inspecting a stripped wire end in accordance with claim 6, wherein said detecting means are photoelectric switches.

8. An apparatus for inspecting a stripped wire end in accordance with claim 6, wherein said decision means includes first and second counters for counting prescribed clocks only for the intervals of said first and second passage signals respectively and a comparison operational circuit for comparing count values of said first and second counters.

9. An apparatus for inspecting a stripped wire end in accordance with claim 6, wherein said decision means includes first and second integration circuits for integrating said first and second passage signals respectively and a voltage comparator for comparing output voltages of said first and second integration circuits with each other.

10. An apparatus for inspecting a stripped wire end in accordance with claim 6, wherein said decision means comprises first and second integration circuits for integrating said first and second passage signals respectively, first and second A-D converters for converting output voltages of said first and second integration circuits into digital values respectively and a comparison operational circuit for comparing said digital values with each other.

* * * * *